United States Patent
Shin et al.

(10) Patent No.: US 9,925,848 B2
(45) Date of Patent: Mar. 27, 2018

(54) AIR CONDITIONING SYSTEM FOR VEHICLE

(71) Applicant: Hyundai Motor Company, Seoul (KR)

(72) Inventors: Gee Young Shin, Gyeonggi-Do (KR); June Kyu Park, Gyeonggi-Do (KR); Keon Soo Jin, Ulsan (KR); Dong Ho Kwon, Gyeongsangbuk-do (KR); Dae Ig Jung, Gyeonggi-Do (KR); Kwang Woon Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/173,518

(22) Filed: Jun. 3, 2016

(65) Prior Publication Data

US 2017/0166031 A1 Jun. 15, 2017

(30) Foreign Application Priority Data

Dec. 10, 2015 (KR) ........................ 10-2015-0175631

(51) Int. Cl.
*B60H 1/00* (2006.01)
*B60H 1/22* (2006.01)
*B60H 1/32* (2006.01)

(52) U.S. Cl.
CPC ..... *B60H 1/00921* (2013.01); *B60H 1/00342* (2013.01); *B60H 1/00842* (2013.01); *B60H 1/00885* (2013.01); *B60H 1/22* (2013.01); *B60H 1/3227* (2013.01); *B60H 2001/00135* (2013.01); *B60H 2001/00178* (2013.01); *B60H 2001/00928* (2013.01); *B60H 2001/00957* (2013.01)

(58) Field of Classification Search
USPC .......................................................... 62/244
See application file for complete search history.

(56) References Cited

U.S. PATENT DOCUMENTS

| 2011/0005255 A1* | 1/2011 | Tanihata | B60H 1/00785 62/238.7 |
| 2011/0120146 A1* | 5/2011 | Ota | B60H 1/00885 62/3.3 |
| 2012/0118005 A1* | 5/2012 | Yamashita | F24F 3/06 62/513 |

(Continued)

FOREIGN PATENT DOCUMENTS

| JP | 2015-193381 A | 11/2015 |
| KR | 2007-0064937 A | 6/2007 |
| KR | 20070082274 A | 8/2007 |

(Continued)

OTHER PUBLICATIONS

Korean Office Action dated Jul. 11, 2017 in corresponding Korean Application No. 10-2017-0075077.

*Primary Examiner* — Mohammad M Ali
(74) *Attorney, Agent, or Firm* — Mintz Levin Cohn Ferris Glovsky and Popeo, P.C.; Peter F. Corless

(57) ABSTRACT

An air conditioning system for a vehicle is provided. The air conditioning system includes a cooling module having a cooling duct and an evaporator core, and a heating module having a heating duct and an inner condenser. Additionally, an outer condenser is disposed extraneous to the heating duct, and a blower forms air flow in the cooling duct or the heating duct. The inner condenser, the outer condenser and the evaporator core are connected via a single refrigerant passage.

13 Claims, 5 Drawing Sheets

(56) References Cited

U.S. PATENT DOCUMENTS

2013/0333406 A1    12/2013   Takahashi
2014/0223943 A1*   8/2014   Ichishi ................. B60H 1/3205
                                                                          62/215

FOREIGN PATENT DOCUMENTS

| KR | 10-2012-0071018 A | 7/2012 |
| KR | 20140032801 A | 3/2014 |
| KR | 10-2015-0088953 | 8/2015 |

* cited by examiner

AIR CONDITIONING SYSTEM FOR VEHICLE

CROSS-REFERENCE TO RELATED APPLICATION

This application claims the priority benefit of Korean Patent Application No. 10-2015-0175631, filed on Dec. 10, 2015 in the Korean Intellectual Property Office, the disclosure of which is incorporated herein by reference.

BACKGROUND

1. Field of the Invention

The present invention relates to a structure of an air conditioning system for a vehicle, and more particularly, to an air conditioning system that realizes more efficient air conditioning operation in a specific traveling environment.

2. Description of the Related Art

Generally, vehicles are equipped with an air conditioning system for heating and cooling the passenger compartment of a vehicle. The main purpose of the air conditioning system is to maintain a suitable indoor temperature and realize a comfortable indoor environment.

A cooling device of an air conditioning system for a vehicle includes a compressor configured to compress a refrigerant, a condenser configured to condense and liquefy the refrigerant compressed by the compressor, an expansion valve configured to change the refrigerant condensed and liquefied by the condenser into a low-temperature and low-pressure refrigerant, and an evaporator core configured to cool air using evaporation latent heat of the refrigerant. The described cooling system reduces the temperature of the air and regulates absolute humidity.

A heating device uses cooling water to cool an engine compartment of a vehicle as a heat source when the cooling water absorbs heat from the engine and has a high temperature. Additionally, the heating source includes a heater core and a pump configured to circulate the cooling water of the engine. The heating device increases the temperature of the air and regulates relative humidity.

In the above-described conventional air conditioning system, the cool air supply is realized by the cooling device, and the hot air supply is realized by the cooling water of the engine. However, the structure of the air conditioning system needs to be changed based on the traveling environment. Particularly, when the engine has no cooling water, it may be difficult to set up the conventional air conditioning system, and the operation thereof may be inefficient.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides an air conditioning system for a vehicle, which creates a new heat source for supplying hot air and has an optimum structure and improved operational efficiency with regard to the new heat source.

In accordance with an aspect of the present invention, the above and other objects may be accomplished by the provision of an air conditioning system for a vehicle, that may include a cooling module having a cooling duct, a cooling-side inlet formed at a first side of the cooling duct, a cooling-side indoor outlet and a cooling-side outdoor outlet formed at a second side of the cooling duct, and an evaporator core and a heat exchanger disposed inside the cooling duct, the heat exchanger being positioned on an upstream side of an air flow path, a heating module having a heating duct, a heating-side inlet formed at a first side of the heating duct, a heating-side indoor outlet and a heating-side outdoor outlet formed at a second side of the heating duct, and an inner condenser disposed inside the heating duct, an outer condenser disposed extraneous to the heating duct, and a blower for forming air flow in the cooling duct or the heating duct, the inner condenser, the outer condenser and the evaporator core being connected to one another via a single refrigerant passage.

The inner condenser may be an air-cooled condenser, through which a refrigerant may flow, and may be cooled by air flow in the heating duct. The outer condenser may be a water-cooled condenser, through which a refrigerant may flow, and may be disposed in the same cooling water circulation passage as the heat exchanger to cool the refrigerant in the outer condenser using cooling water. The outer condenser, the heat exchanger and electronic components of a vehicle may be disposed in the same cooling water circulation passage. The air conditioning system may further include a compressor and an expansion valve, the compressor and the expansion valve being connected to each other via the refrigerant passage.

Additionally, the air conditioning system may include a cooling-side exhaust adjusting door disposed between the indoor outlet and the outdoor outlet of the cooling duct to adjust the amount of outward air flow, and a heating-side exhaust adjusting door disposed between the indoor outlet and the outdoor outlet of the heating duct to adjust the amount of outward air flow. The air conditioning system may further include a compressor and an expansion valve, the compressor and the expansion valve being connected to each other via the refrigerant passage. The refrigerant passage may include a first circulation passage to allow a refrigerant to sequentially circulate through the evaporator core, the compressor, a first branch point, a second branch point, the inner condenser and the expansion valve, and a second circulation passage to allow the refrigerant to diverge from the first branch point, pass through the outer condenser, and flow into the second branch point.

The air conditioning system may further include a cooling water circulation passage. The cooling water circulation passage may include a first cooling water circulation passage to allow cooling water to sequentially circulate through a third branch point, the outer condenser and a fourth branch point, and cool the outer condenser, and a second cooling water circulation passage to allow the cooling water to diverge from the third branch point, pass through the heat exchanger, and flow into the fourth branch point. The air conditioning system may further include first through fourth three-way valves disposed at the first through fourth branch points, respectively.

In addition, air conditioning system may include a controller configured to operate the first through fourth three-way valves. When the air conditioning system is operated in a cooling mode, the controller may be configured to operate the first three-way valve and the second three-way valve to allow a portion of the refrigerant circulating along the first circulation passage to diverge from the first three-way valve, circulate along the second circulation passage, and flow into the second three-way valve, and may be configured to operate the third three-way valve and the fourth three-way valve to circulate the cooling water along the first cooling water circulation passage.

The controller may further be configured to operate the cooling-side exhaust adjusting door and the heating-side exhaust adjusting door. When the air conditioning system is operated in a cooling mode, the controller may be configured to operate the heating-side exhaust adjusting door to close the heating-side indoor outlet, and operate the cooling-side exhaust adjusting door to close the cooling-side outdoor outlet.

In addition, the controller may be configured to operate the first through fourth three-way valves. When the air conditioning system is operated in a heating mode, the controller may be configured to operate the first three-way valve and the second three-way valve to circulate the refrigerant along the first circulation passage, and operate the third three-way valve and the fourth three-way valve to diverge the cooling water from the third three-way valve, circulate along the second cooling water circulation passage, and flow into the fourth three-way valve.

The controller may further be configured to operate the cooling-side exhaust adjusting door and the heating-side exhaust adjusting door. When the air conditioning system is operated in a heating mode, the controller may be configured to operate the heating-side exhaust adjusting door to close the heating-side outdoor outlet, and operate the cooling-side exhaust adjusting door to close the cooling-side indoor outlet.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
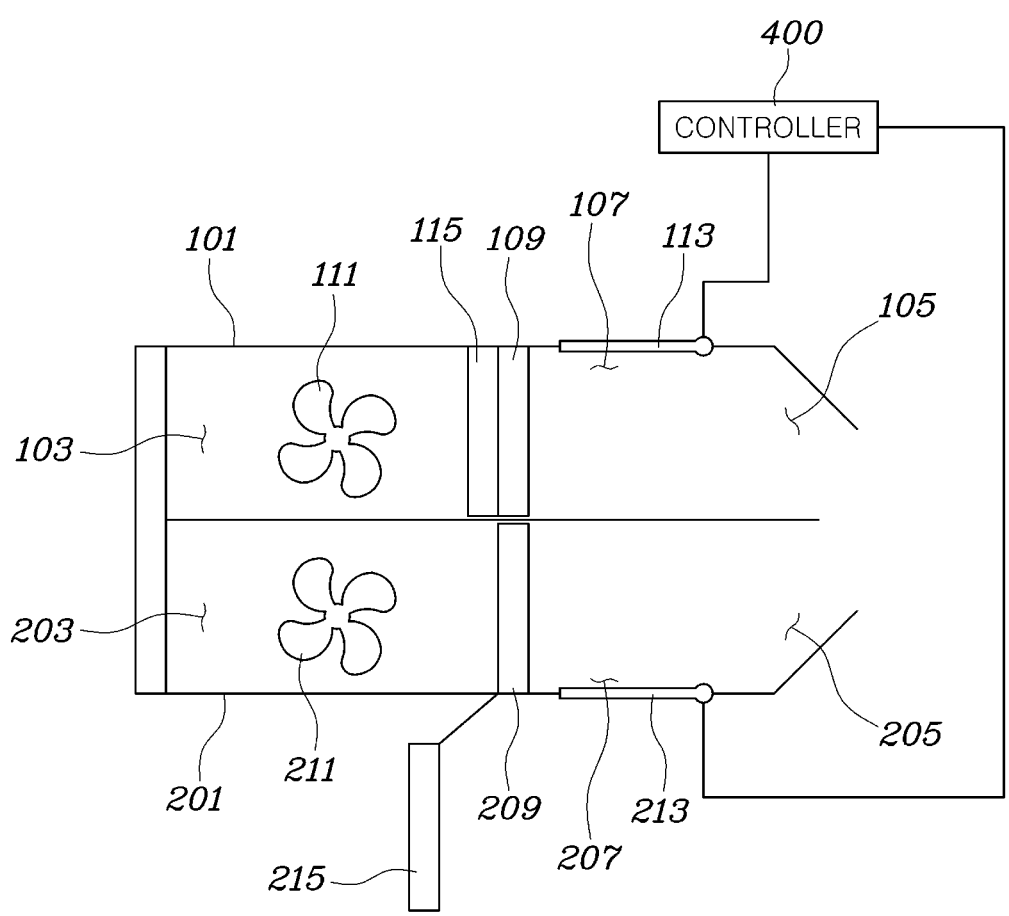
FIG. 1 is a view of an air conditioning system for a vehicle according to an exemplary embodiment of the present invention.
Figure 2:
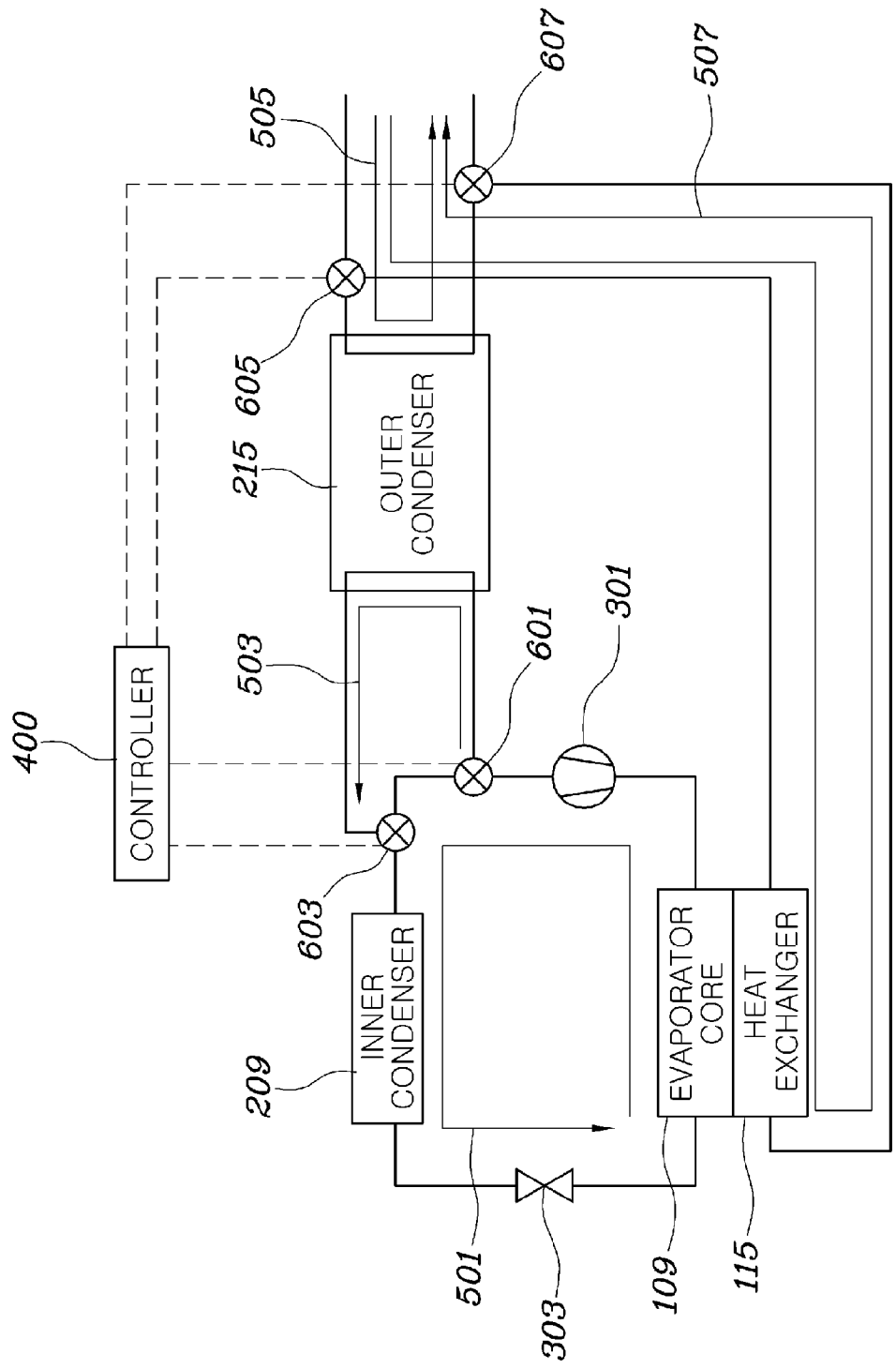
FIG. 2 is a view illustrating the circulation passage of the air conditioning system for a vehicle according to the exemplary embodiment of the present invention.
Figure 3:
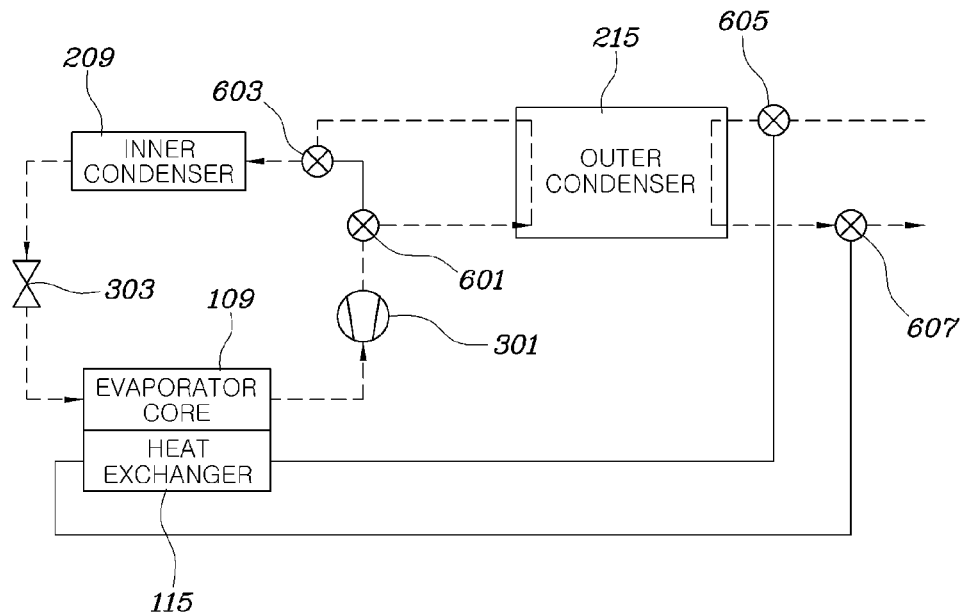
FIG. 3 is a view illustrating the circulation passage in a cooling mode of the air conditioning system for a vehicle according to the exemplary embodiment of the present invention.
Figure 4:
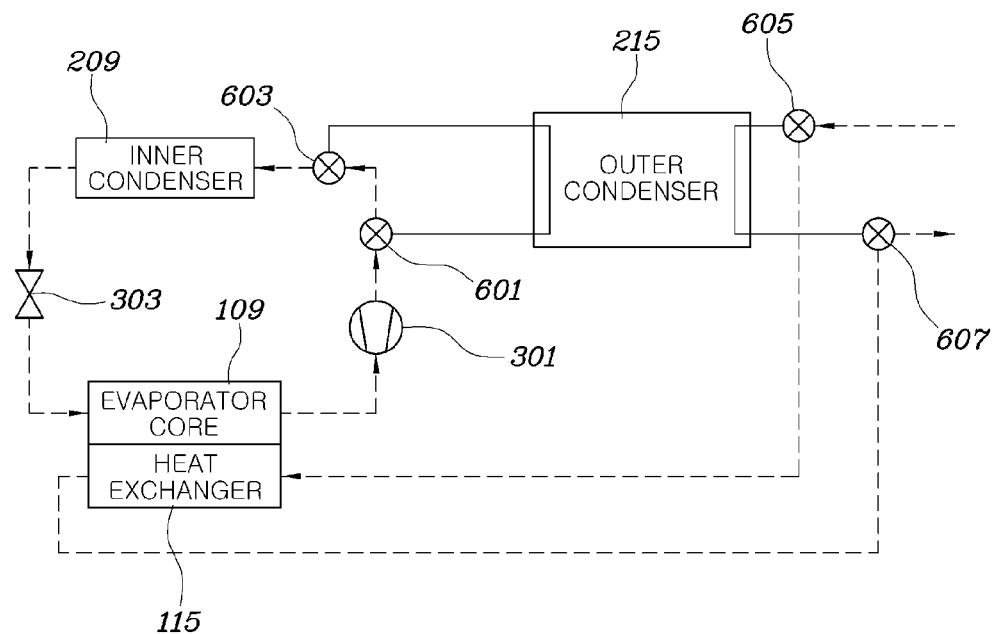
FIG. 4 is a view illustrating the circulation passage in a heating mode of the air conditioning system for a vehicle according to the exemplary embodiment of the present invention.
Figure 5:
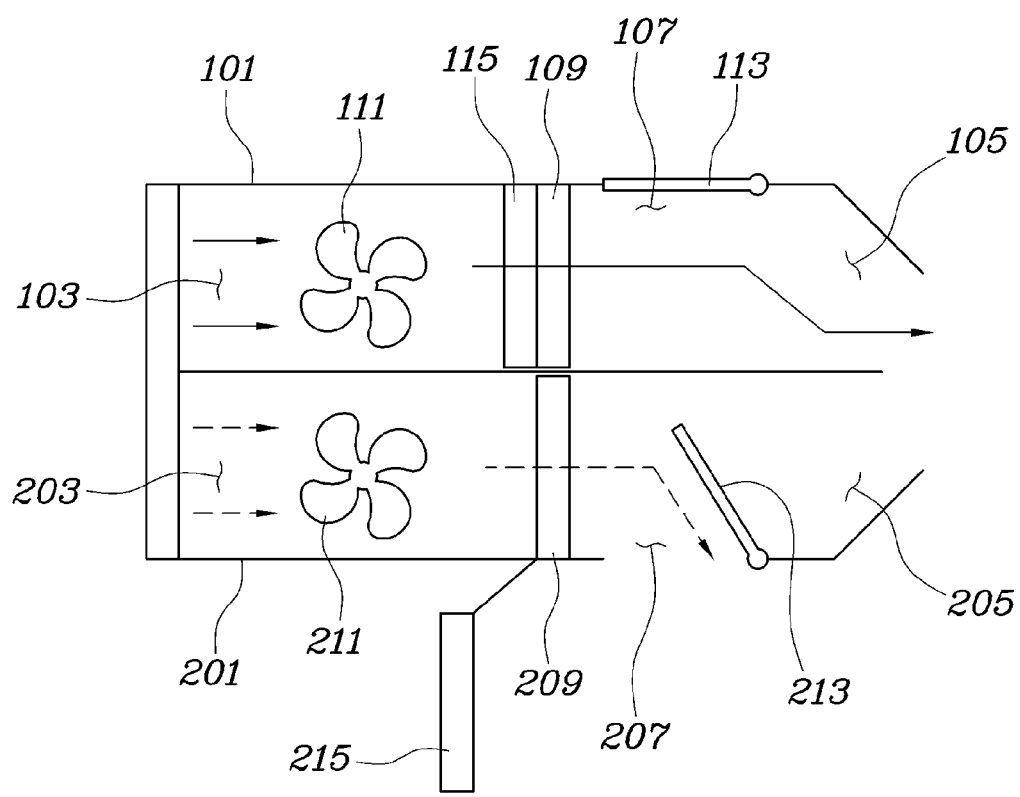
FIG. 5 is a view showing the operational state of the cooling mode of the air conditioning system for a vehicle according to the exemplary embodiment of the present invention.
Figure 6:
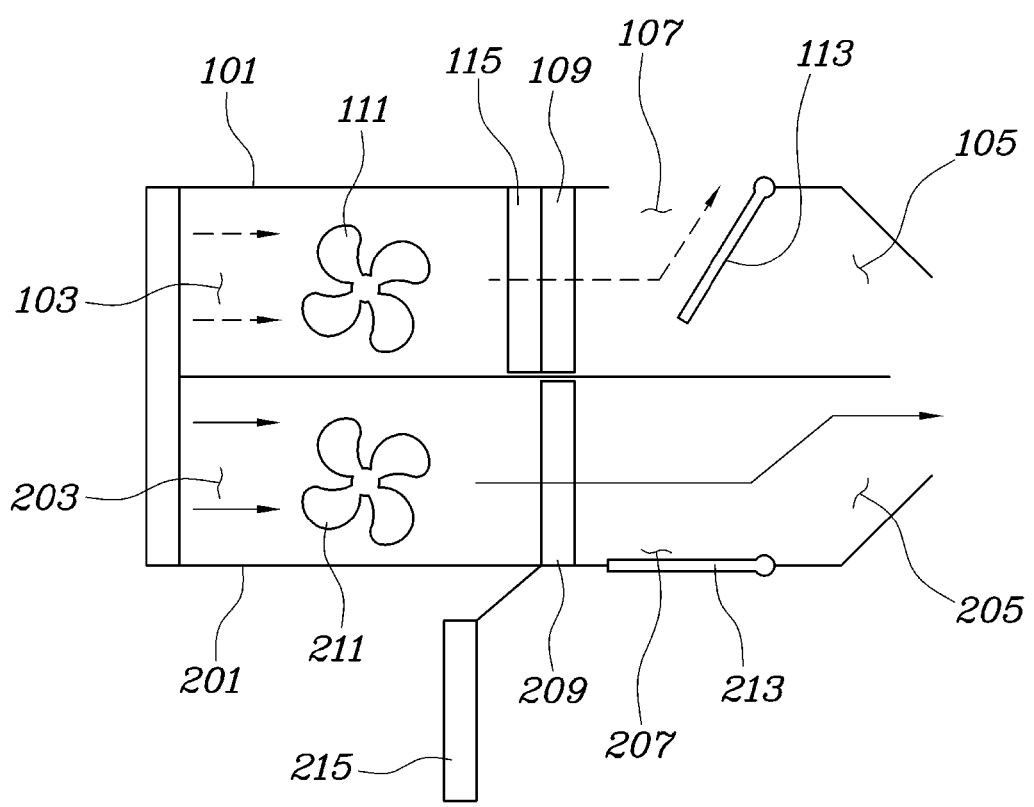
FIG. 6 is a view showing the operational state of the heating mode of the air conditioning system for a vehicle according to the exemplary embodiment of the present invention.

FIG. 1 is a view of an air conditioning system for a vehicle according to an exemplary embodiment of the present invention, FIG. 2 is a view illustrating the circulation passage of the air conditioning system for a vehicle according to the exemplary embodiment of the present invention, FIG. 3 is a view illustrating the circulation passage in a cooling mode of the air conditioning system for a vehicle according to the exemplary embodiment of the present invention, FIG. 4 is a view illustrating the circulation passage in a heating mode of the air conditioning system for a vehicle according to the exemplary embodiment of the present invention, FIG. 5 is a view showing the operational state of the cooling mode of the air conditioning system for a vehicle according to the exemplary embodiment of the present invention, and FIG. 6 is a view showing the operational state of the heating mode of the air conditioning system for a vehicle according to the exemplary embodiment of the present invention.

An air conditioning system for a vehicle according to an exemplary embodiment of the present invention may include: a cooling module having a cooling duct 101, a cooling-side inlet 103 formed at a first side of the cooling duct 101, a cooling-side indoor outlet 105 and a cooling-side outdoor outlet 107 formed at a second side of the cooling duct 101, and an evaporator core 109 and a heat exchanger 115 disposed inside the cooling duct 101, the heat exchanger 115 being positioned on an upstream side of an air flow path; a heating module having a heating duct 201, a heating-side inlet 203 formed at a first side of the heating duct 201, a heating-side indoor outlet 205 and a heating-side outdoor outlet 207 formed at a second side of the heating duct 201, and an inner condenser 209 disposed inside the heating duct 201; an outer condenser 215 disposed extraneous to the heating duct 201; and blowers 111 and 211 for forming air flow in the cooling duct 101 and the heating duct 201. The inner condenser 209, the outer condenser 215 and the evaporator core 109 may be connected to one another via a single refrigerant passage. A compressor 301 and an expansion valve 303 may also be connected together via the refrigerant passage.

Referring to FIG. 1, the cooling duct 101 may be disposed in the cooling module. The cooling-side inlet 103 may be formed at a first side of the cooling duct 101, and the cooling-side indoor outlet 105 and the cooling-side outdoor outlet 107 may be formed at a second side of the cooling duct 101. The evaporator core 109 and the heat exchanger 115 may be disposed inside the cooling duct 101. The heat exchanger 115 may be positioned on an upstream side of the air flow path. The heating duct 201 may be disposed in the heating module. The heating-side inlet 203 may be formed at a first side of the heating duct 201, and the heating-side indoor outlet 205 and the heating-side outdoor outlet 207 may be formed at a second side of the heating duct 201. The inner condenser 209 may be disposed inside the heating duct 201 and the outer condenser 215 may be disposed extraneous to the heating duct 201. The blowers 111 and 211 may form air flow in the cooling duct 101 and the heating duct 201. The inner condenser 209, the outer condenser 215 and the evaporator core 109 may be connected to one another via a single refrigerant passage.

Since the cooling duct 101 and the heating duct 201 may be formed as separate independent spaces, interference between the cooled air and the heated air may be reduced. In other words, the cooled air may be prevented from being re-heated, and the heated air may be prevented from being re-cooled. Accordingly, the efficiency of the air conditioning system may be improved. Further, since the outlet of each of the cooling duct 101 and the heating duct 201 may be divided into an indoor outlet and an outdoor outlet, which are provided separately, the air conditioning system of the present invention has an advantage that the temperature-controlled air may be supplied to the indoor space and the temperature-controlled air may be discharged to the outdoor space as needed.

Referring to FIG. 2, since the expansion valve 303, the evaporator core 109, the compressor 301, and the condenser may be disposed in a single refrigerant passage, the high-temperature and high-pressure refrigerant that has passed through the compressor 301 may be used as a heat source. In other words, the cooling operation and the heating operation may be achieved simultaneously using only the cooling system of a conventional air conditioning system for a vehicle. This may be useful when it is impossible to secure a heat source such as cooling water of the engine. Further, the air conditioning system for a vehicle of the present invention has a simplified structure since a heating line and a water pump for a heating operation may be omitted.

The inner condenser 209 may be embodied as an air-cooled condenser, through which the refrigerant may flow, and may be cooled by the air flow in the heating duct 201. The outer condenser 215 may be embodied as a water-cooled condenser, through which the refrigerant may flow, and may be disposed in the same cooling water circulation passage as the heat exchanger 115 to cool the refrigerant in the outer condenser 215 using the cooling water. The outer condenser 215, the heat exchanger 115 and the electronic components of the vehicle may be disposed in the same cooling water circulation passage.

Further, the compressor 301 and the expansion valve 303 may connected to each other via the refrigerant passage. The refrigerant passage may include a first circulation passage 501, along which the refrigerant may sequentially circulate through the evaporator core 109, the compressor 301, the first branch point 601, the second branch point 603, the inner condenser 209 and the expansion valve 303, and a second circulation passage 503, along which the refrigerant may diverge from the first branch point 603, pass through the outer condenser 215, and flow into the second branch point 603.

The cooling water circulation passage may include a first cooling water circulation passage 505, along which the cooling water may sequentially circulate through the third branch point 605, the water-cooled condenser and the fourth branch point 607 to cool the water-cooled condenser, and a second cooling water circulation passage 507, along which the cooling water may diverge from the third branch point 605, pass through the heat exchanger 115, and flow into the fourth branch point 607.

The air conditioning system of the present invention may further include a controller 400 configured to operate first through fourth three-way valves. When the air conditioning system is operated in the cooling mode, the controller 400 may be configured to operate the first three-way valve and the second three-way valve to allow a portion of the refrigerant circulating along the first circulation passage 501 to diverge from the first three-way valve, circulate along the second circulation passage 503, and flow into the second three-way valve, and may be configured to operate the third three-way valve and the fourth three-way valve to allow the cooling water to circulate along the first cooling water circulation passage 505.

When the air conditioning system is operated in the heating mode, the controller 400 may be configured to operate the first three-way valve and the second three-way valve to allow the refrigerant to circulate along the first circulation passage 501, and may be configured to operate the third three-way valve and the fourth three-way valve to allow the cooling water to diverge from the third three-way valve, circulate along the second cooling water circulation passage 507, and flow into the fourth three-way valve. The first through fourth three-way valves may be disposed at the first through fourth branch points 601 through 607, respectively.

Referring to FIG. 2, the refrigerant, flowing along the first circulation passage 501, may sequentially circulate through the evaporator core 109, the compressor 301, the first three-way valve, the second three-way valve, the inner condenser 209 and the expansion valve 303. The refrigerant, flowing along the second circulation passage 503, may diverge from the first three-way valve, pass through the outer condenser 215, and flow into the second three-way valve.

As shown in FIG. 2, the cooling water, flowing along the first cooling water circulation passage 505, may circulate through the electronic components, and sequentially circulate through the third three-way valve, the water-cooled condenser and the fourth three-way valve. The cooling water, flowing along the second cooling water circulation passage 507, may diverge from the third three-way valve, pass through the heat exchanger 115, and flow into the fourth three-way valve.

When the air conditioning system is operated in the cooling mode, to increase the efficiency of the air conditioning system, the temperature of the refrigerant passing through the condenser may be rapidly decreased by increasing the amount of heat dissipated by the condenser. In particular, when the refrigerant, which has passed through the expansion valve 303, flows into the evaporator core 109, the temperature of the refrigerant may be decreased, thereby absorbing a substantial amount of heat from the air that passes through the cooling duct 101.

Further, as shown in FIG. 3, since the refrigerant may circulate along both the first circulation passage 501 and the second circulation passage 503, the amount of heat dissipated by the refrigerant may be increased through the air-cooled inner condenser 209 and the water-cooled outer condenser 215, thereby improving the efficiency of the air conditioning system.

Moreover, when the air conditioning system is operated in the heating mode, as shown in FIG. 4, and the temperature of the refrigerant passing through the condenser is substantially high (e.g., greater than a predetermined temperature), the amount of heat to be supplied to the air passing through the heating duct 201 may be increased. Accordingly, the refrigerant may be controlled to circulate only along the first circulation passage 501, and may be prevented from passing through the water-cooled outer condenser 215.

Additionally, the cooling water, which has cooled the electronic components and absorbed thermal energy therefrom, may be controlled to circulate through the heat exchanger 115, disposed on the upstream side of the evaporator core 109, to transmit the thermal energy, which the cooling water has absorbed from the electronic components, to the evaporator core 109. Accordingly, the temperature of the refrigerant may be increased, and as a result, the efficiency of the air conditioning system may be improved.

The air conditioning system of the present invention may further include a cooling-side exhaust adjusting door 113, disposed between the indoor outlet 105 and the outdoor outlet 107 of the cooling duct 101 to adjust the amount of outward air flow, and a heating-side exhaust adjusting door 213, disposed between the indoor outlet 205 and the outdoor outlet 207 of the heating duct 201 to adjust the amount of outward air flow.

Referring to FIGS. 5 and 6, the air conditioning system of the present invention may be adjusted to determine whether to supply the temperature-controlled air to the indoor space or discharge the temperature-controlled air to the outdoor space through the cooling-side exhaust adjusting door 113 and the heating-side exhaust adjusting door 213. The indoor temperature may be more accurately controlled by adjusting the mixing ratio of the air which is cooled or heated by the cooling module or the heating module using the cooling-side exhaust adjusting door 113 and the heating-side exhaust adjusting door 213.

The controller 400 may be configured to operate the cooling-side exhaust adjusting door 113 and the heating-side exhaust adjusting door 213. When the air conditioning system is operated in the cooling mode, the controller 400 may be configured to operate the heating-side exhaust adjusting door 213 to close the heating-side indoor outlet 205, and operate the cooling-side exhaust adjusting door 113 to close the cooling-side outdoor outlet 107. As shown in FIG. 5, in the maximum cooling mode, the cooling-side exhaust adjusting door 113 may be configured to close the cooling-side outdoor outlet 107 to supply the cooled air to the indoor space, and the heating-side exhaust adjusting door 213 may be configured to close the heating-side indoor outlet 205 to discharge the heated air to the outdoor space.

Additionally, when the air conditioning system is operated in the heating mode, the controller 400 may be configured to operate the heating-side exhaust adjusting door 213 to close the heating-side outdoor outlet 207, and operate the cooling-side exhaust adjusting door 113 to close the cooling-side indoor outlet 105. As shown in FIG. 6, in the maximum heating mode, the heating-side exhaust adjusting door 213 may be configured to close the heating-side outdoor outlet 207 to supply the heated air to the indoor space, and the cooling-side exhaust adjusting door 113 may be configured to close the cooling-side indoor outlet 105 to discharge the cooled air to the outdoor space.

As is apparent from the above description, the present invention provides an air conditioning system for a vehicle, which may improve energy efficiency and operational efficiency in an environment in which there is no supply of cooling water from an engine.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air conditioning system for a vehicle, comprising:
   a cooling module including a cooling duct, a cooling-side inlet formed a first side of the cooling duct, a cooling-side indoor outlet and a cooling-side outdoor outlet formed at a second side of the cooling duct, and an evaporator core and a heat exchanger disposed inside the cooling duct, the heat exchanger disposed on an upstream side of an air flow path;
   a heating module including a heating duct, a heating-side inlet formed at a first side of the heating duct, a heating-side indoor outlet and a heating-side outdoor outlet formed at a second side of the heating duct, and an inner condenser disposed inside the heating duct;
   an outer condenser disposed extraneous to the heating duct; and
   a blower for forming air flow in the cooling duct or the heating duct,
   wherein the inner condenser, the outer condenser and the evaporator core are connected via a single refrigerant passage.

2. The air conditioning system according to claim 1, wherein the inner condenser is an air-cooled condenser, through which a refrigerant flows, and is cooled by air flow in the heating duct.

3. The air conditioning system according to claim 1, wherein the outer condenser is a water-cooled condenser, through which a refrigerant flows, and is disposed in a same cooling water circulation passage as the heat exchanger to cool the refrigerant in the outer condenser using cooling water.

4. The air conditioning system according to claim 3, wherein the outer condenser, the heat exchanger and electronic components of a vehicle are disposed in the same cooling water circulation passage.

5. The air conditioning system according to claim 1, further comprising:
   a compressor; and
   an expansion valve,
   wherein the compressor and the expansion valve are connected via the refrigerant passage.

6. The air conditioning system according to claim 1, further comprising:
   a cooling-side exhaust adjusting door disposed between the indoor outlet and the outdoor outlet of the cooling duct to adjust the amount of outward air flow; and
   a heating-side exhaust adjusting door disposed between the indoor outlet and the outdoor outlet of the heating duct to adjust the amount of outward air flow.

7. The air conditioning system according to claim 1, further comprising:

a compressor; and an expansion valve, wherein the compressor and the expansion valve are connected via the refrigerant passage, and wherein the refrigerant passage includes:

a first circulation passage to allow a refrigerant to sequentially circulate through the evaporator core, the compressor, a first branch point, a second branch point, the inner condenser and the expansion valve; and a second circulation passage to allow the refrigerant to diverge from the first branch point, pass through the outer condenser, and flow into the second branch point.

8. The air conditioning system according to claim 7, further comprising:

a cooling water circulation passage, the cooling water circulation passage including:

a first cooling water circulation passage to allow cooling water to sequentially circulate through a third branch point, the outer condenser and a fourth branch point, and cool the outer condenser; and a second cooling water circulation passage to allow the cooling water to diverge from the third branch point, pass through the heat exchanger, and flow into the fourth branch point.

9. The air conditioning system according to claim 8, further comprising:

first through fourth three-way valves disposed at the first through fourth branch points, respectively.

10. The air conditioning system according to claim 9, further comprising:

a controller configured to operate the first through fourth three-way valves, wherein when the air conditioning system is operated in a cooling mode, the controller is configured to operate the first three-way valve and the second three-way valve to allow a portion of the refrigerant circulating along the first circulation passage to diverge from the first three-way valve, circulate along the second circulation passage, and flow into the second three-way valve, and operate the third three-way valve and the fourth three-way valve to allow the cooling water to circulate along the first cooling water circulation passage.

11. The air conditioning system according to claim 6, further comprising:

a controller configured to operate the cooling-side exhaust adjusting door and the heating-side exhaust adjusting door, wherein when the air conditioning system is operated in a cooling mode, the controller is configured to operate the heating-side exhaust adjusting door to close the heating-side indoor outlet, and operate the cooling-side exhaust adjusting door to close the cooling-side outdoor outlet.

12. The air conditioning system according to claim 9, further comprising:

a controller configured to operate the first through fourth three-way valves, wherein when the air conditioning system is operated in a heating mode, the controller is configured to operate the first three-way valve and the second three-way valve to allow the refrigerant to circulate along the first circulation passage, and operate the third three-way valve and the fourth three-way valve to allow the cooling water to diverge from the third three-way valve, circulate along the second cooling water circulation passage, and flow into the fourth three-way valve.

13. The air conditioning system according to claim 6, further comprising:

a controller configured to operate the cooling-side exhaust adjusting door and the heating-side exhaust adjusting door, wherein when the air conditioning system is operated in a heating mode, the controller is configured to operate the heating-side exhaust adjusting door to close the heating-side outdoor outlet, and operate the cooling-side exhaust adjusting door to close the cooling-side indoor outlet.

\* \* \* \* \*